US010309459B2

(12) United States Patent
Schmidt

(10) Patent No.: US 10,309,459 B2
(45) Date of Patent: Jun. 4, 2019

(54) BALL BEARING FOR A TURBOCHARGER

(71) Applicant: Schaeffler Technologies AG & Co. KG, Herzogenaurach (DE)

(72) Inventor: Heiko Schmidt, Muehlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/324,788

(22) PCT Filed: Jun. 1, 2015

(86) PCT No.: PCT/DE2015/200327
§ 371 (c)(1),
(2) Date: Jan. 9, 2017

(87) PCT Pub. No.: WO2016/004935
PCT Pub. Date: Jan. 14, 2016

(65) Prior Publication Data
US 2017/0198750 A1 Jul. 13, 2017

(30) Foreign Application Priority Data
Jul. 8, 2014 (DE) .................. 10 2014 213 256

(51) Int. Cl.
*F16C 33/46* (2006.01)
*F16C 33/58* (2006.01)
(Continued)

(52) U.S. Cl.
CPC .......... *F16C 33/3806* (2013.01); *F01D 25/16* (2013.01); *F16C 19/184* (2013.01);
(Continued)

(58) Field of Classification Search
CPC ...... F16C 19/163; F16C 19/184; F16C 19/33; F16C 19/3806; F16C 19/585; F16C 2220/60; F16C 2360/24
See application file for complete search history.

(56) References Cited

U.S. PATENT DOCUMENTS 3,096,129 A * 7/1963 Hay ....................... F16C 19/14
384/470
8,622,622 B2 1/2014 Solfrank et al.
(Continued)

FOREIGN PATENT DOCUMENTS

DE 10152847 4/2005
DE 10343881 4/2005
(Continued)

*Primary Examiner* — Phillip A Johnson
(74) *Attorney, Agent, or Firm* — Davidson, Davidson & Kappel, LLC

(57) ABSTRACT

An angular ball bearing for a turbocharger, including an outer ring and a cage, along the circumference of which rolling element pockets are arranged and at the end face of which a cage guide surface runs, the cage guide surface together with a surface on the inner circumference of the outer ring forming a sliding surface pair. The sliding surface pair forms a transition region at the sliding surface pair end facing the rolling element pockets such that—when the cage and the outer ring are positioned in an axially parallel manner, the spacing between the surfaces which form the sliding surface pair increases in a monotonous manner, said increase growing continuously. The progression of the spacing achieves a reduction of the wear susceptibility.

12 Claims, 7 Drawing Sheets

(51) Int. Cl.
*F16C 33/38* (2006.01)
*F16C 19/18* (2006.01)
*F01D 25/16* (2006.01)

(52) U.S. Cl.
CPC ........ *F16C 33/3843* (2013.01); *F16C 33/585* (2013.01); *F05D 2220/40* (2013.01); *F05D 2240/54* (2013.01); *F16C 2220/60* (2013.01); *F16C 2360/24* (2013.01)

(56) References Cited

U.S. PATENT DOCUMENTS

| | | | |
|---|---|---|---|
| 9,086,093 B2 | 7/2015 | Metrikin | |
| 9,581,198 B2 | 2/2017 | Oomoto | |
| 2006/0233476 A1 | 10/2006 | Bayer et al. | |
| 2009/0148087 A1* | 6/2009 | Suzuki | F16C 33/3806 384/462 |
| 2010/0104233 A1 | 4/2010 | Bando et al. | |

FOREIGN PATENT DOCUMENTS

| | | | |
|---|---|---|---|
| DE | 102007013727 | 11/2008 | |
| DE | 10 2009 021 641 A1 | 11/2010 | |
| DE | 112009001169 | 4/2011 | |
| DE | 112009001504 | 5/2011 | |
| DE | 102011111470 | 2/2013 | |
| EP | 1975432 | 10/2008 | |
| EP | 1975432 A1 * | 10/2008 | ............ F16C 19/163 |
| EP | 2141373 | 1/2010 | |
| JP | 2003323048 | 11/2003 | |
| JP | 2007303558 | 11/2007 | |
| WO | WO-2005031179 A1 * | 4/2005 | ............ F16C 19/163 |
| WO | WO2014126930 | 8/2014 | |
| WO | WO2014181823 | 11/2014 | |

* cited by examiner

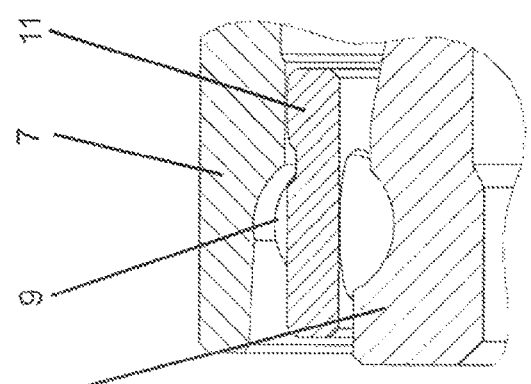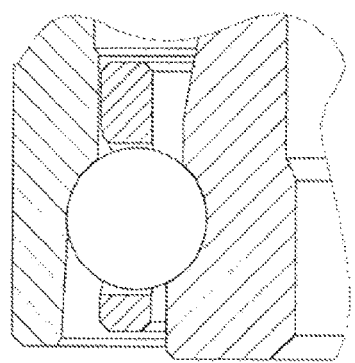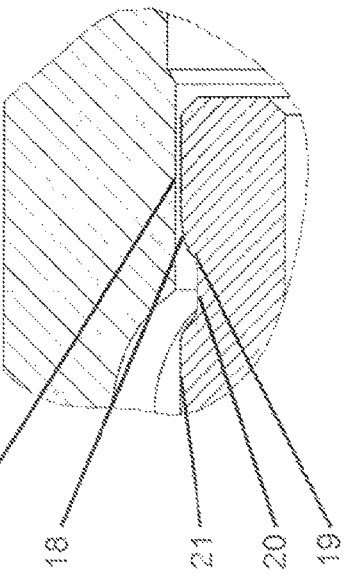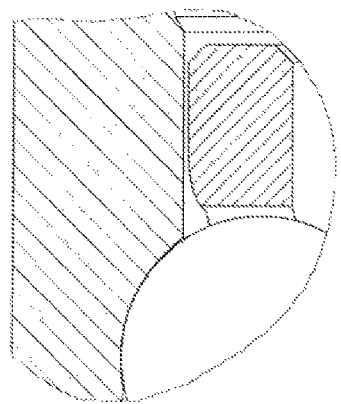

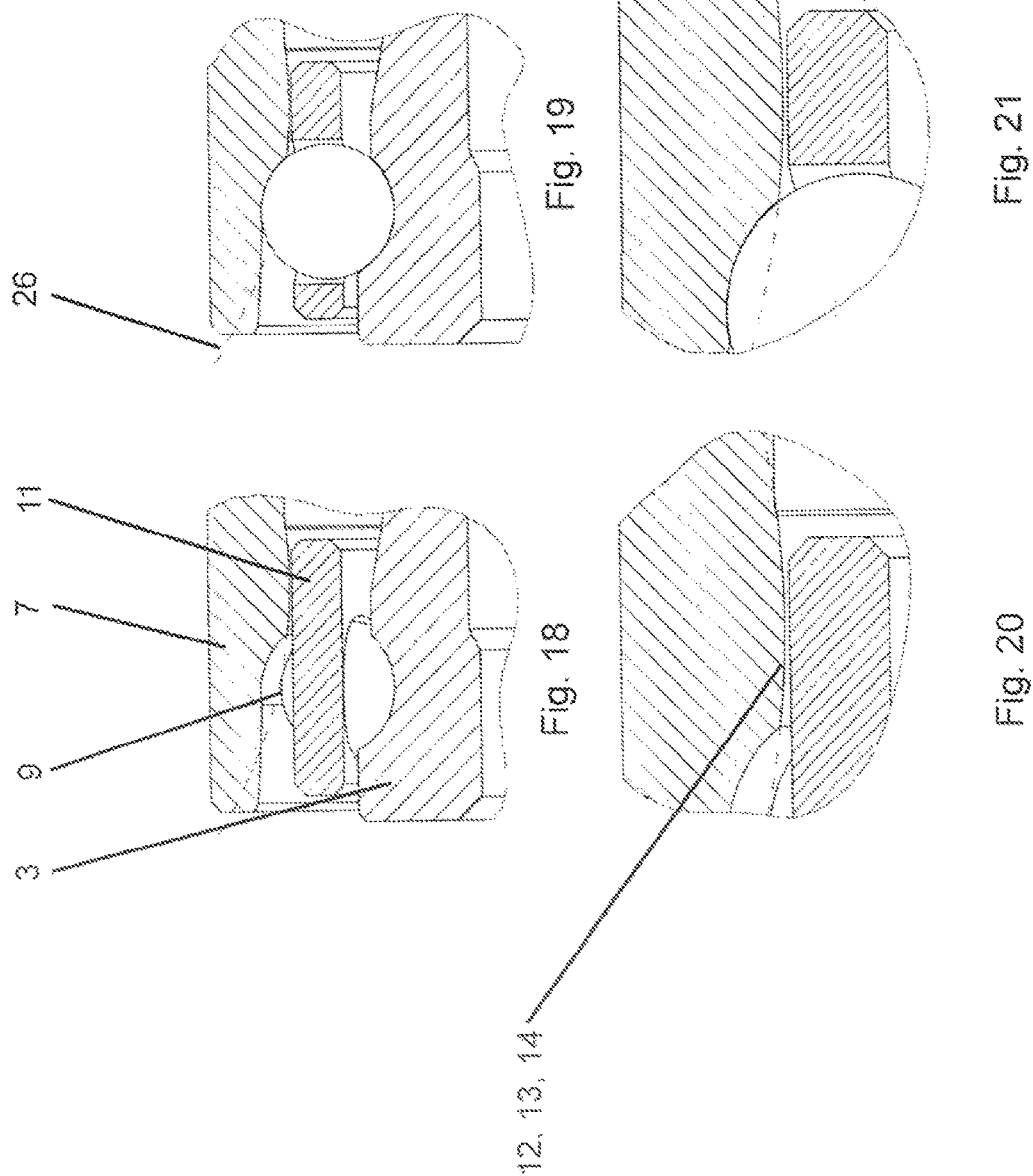

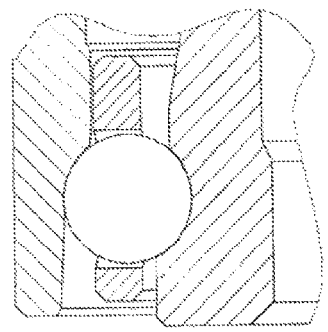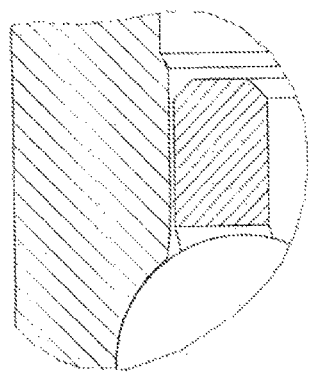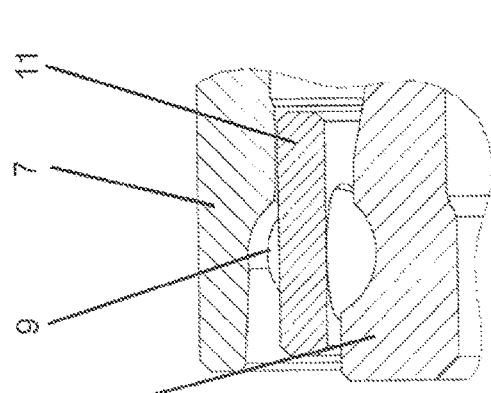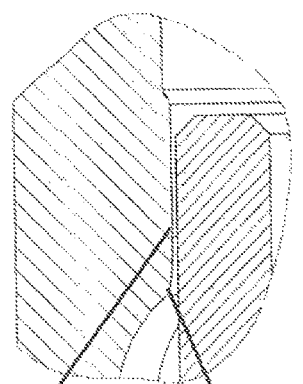

BALL BEARING FOR A TURBOCHARGER

The present invention relates to an angular ball bearing for supporting and guiding the rotor shaft of a turbocharger. Ball bearings include balls as rolling elements as well as an outer ring and possibly an inner ring, on each of which a rolling track is formed. The balls roll along the rolling tracks between the outer and inner rings and are spaced a distance apart with the aid of a cage having rolling element pockets distributed over its circumference. The cage may be guided on the rolling elements or on one of the rings; in turbochargers, the guidance usually takes place on the outer ring—although a guidance on the inner ring is also possible. The special operating conditions of a turbocharger present special challenges to the design of the bearing. The rotor shaft rotates at a rotational speed which introduces high stresses into the bearing, due to its absolute height and its fluctuations. Turbochargers are operated at constantly changing rotational speeds, which at their peak may be up to 300,000 revolutions per minute. Moreover, high operating temperatures prevail in the vicinity of the turbine wheel, in particular, which act upon the lubricant and the materials used. Comparable operating conditions also apply to the bearing of rotor shafts for compressors and so-called turbo-compounds.

BACKGROUND

A rolling bearing for a turbocharger is known from DE 10 2009 021 641 A1, which includes an outer ring, an inner ring and a cage, on which rolling element pockets are formed for guiding rolling elements. The cage includes a single annular part arranged radially between the outer ring and the inner ring, which has a cage guiding surface in parallel to the inner surface of the outer ring—the cage is also provided with an asymmetrical design in such a way that the annular part is formed by two axial ring sections arranged along a plane, which is drawn through the center points of the rolling elements and is situated perpendicularly to the rotation axis of the rolling bearing, the cage guiding surface being formed on the axially wider ring section. An oil film for damping is provided between the cage guiding surface and the inner diameter, whose formation is promoted by arranging at least one radial recess in the area of the cage guiding surface.

A relative movement may occur between certain elements of a rolling bearing, which are in contact with each other, so that—as a result of the contact thereof—friction of the structure is immanent. Friction resulting from an unplanned and thus unproductive contact between relatively movable elements may, however, cause an unnecessarily high wear, which reduces the functionality and service life of the bearing. The occurrence of damage would not be without consequences for the turbocharger—there is the risk of a failure of the overall device and a premature replacement. For this reason, strict requirements are imposed on the wear behavior of ball bearings even under extreme operating conditions.

SUMMARY OF THE INVENTION

It is an object of the present invention to provide an angular ball bearing for a turbocharger which is optimized with regard to the wear behavior.

The angular ball bearing according to the present invention for a turbocharger includes an outer ring and a cage, along whose circumference rolling element pockets are arranged and along whose one end a cage guiding surface runs, which forms a sliding surface pair together with a surface on the inner circumference of the outer ring, the sliding surface pair forming a transition area on its end facing the rolling element pockets in such a way that—in the axially parallel position of the cage and the outer ring—the distance between the surfaces forming the sliding surface pair is monotonically increased, the increase growing continuously (distance progression).

The wear behavior of a ball bearing is essentially influenced by the operating conditions of the supported turbocharger. Forces act upon the bearing in the axial and radial directions, the resulting force along the circumference not being constant in terms of either amount or direction. The type and extent of the wear may thus be directly attributed to this specific load situation.

According to the finding of the present invention, the specific load situation may be accommodated in that, due to the design according to the present invention of the relatively movable elements, whose unproductive contact is avoided—the operating conditions of the turbocharger themselves are not influenced but only the impact thereof: The specific load situation having a variable force along its circumference results in a variable operating pressure angle along the circumference. This, in turn, results in a forward and backward movement of the rolling elements, which in extreme cases introduce a force into the cage—combined with friction and wear at the contact point. The forward and backward movement is further intensified in the presence of a high rotational speed characteristic factor (Dm×n).

The cage is initially deflected out of its coaxial position in the radial direction, whereby the formation of the necessary lubrication film between the outer ring and the cage guiding surface is disturbed. There is the risk of a direct contact between the cage and the outer ring, which move relative to each other. As a result of its radial deflection, the cage is supported on the cage guiding surface of the outer ring, a lever arm being formed between the application point of the force and the point of support. The cage tilts. The tilting results in unnecessarily high friction, because the guiding surfaces in this case do not run in parallel to each other. There is the risk of a contact between the cage and the ring edge, which runs at the transition between the rolling track and the guiding surface. In addition, a solid-body corner contact may occur if the contact line on the cage is interrupted by bores for rolling element pockets.

In any case, an excessive wear occurs, which may reduce the functionality and service life of the bearing—with negative consequences for the service life of the overall device. The present invention has a positive influence on the wear behavior: The negative impact on the wear resulting from the tilting is reduced in that the sliding surface pair forms a transition area on its end facing the rolling element pockets in such a way that—in the axially parallel position of the cage and the outer ring—the distance between the surfaces forming the sliding surface pair is monotonically increased, the increase growing continuously (distance progression).

One advantageous specific embodiment is an angular ball bearing, in which the distance progression is implemented with the aid of a cage which is not uniform with regard to its outer diameter, the outer diameter being larger in the area of the sliding surface pair than in the transition area. The advantage of this specific embodiment is that the contour of the cage may be manufactured with the aid of a machining method, for example by turning. In this way, a large range of different contours may be implemented, which are adapted to avoid unnecessary wear.

In another embodiment, the transition area transitions into a runout area at the end facing away from the area forming the sliding surface pair, the runout area being designed in such a way that the outer diameter of the cage is reduced to its minimum value. The stress-resistant specific embodiment implemented in this way may be achieved in another embodiment with the aid of a double radius. A convex profile of the contour is implemented in this way in the transition area, while a convex profile is implemented in the runout area.

One advantageous specific embodiment is an angular ball bearing, in which an area having a minimum outer diameter, which is enclosed by areas having a larger diameter, abuts the runout area at the end facing away from the transition area. The advantage of this specific embodiment is an optimization of the forces absorbable by the cage: Despite the distance progression due to the reduction in the cage diameter, a circumferential wall of a sufficiently strong design is provided in the area of the rolling element pockets—the design of the cage may thus be adapted to the specific load situation, whereby material costs may be reduced.

Another advantageous specific embodiment relates to an angular ball bearing, in which the distance progression is implemented with the aid of an outer ring which is not uniform with regard to its inner diameter, the inner diameter being smaller in the area of the sliding surface pair than in the transition area. The distance progression may thus be implemented not only by a configuration on the outer circumference of the cage but also by a corresponding configuration on the inner circumference of the outer ring.

In one advantageous refinement, the surface forming the transition area on the inner diameter of the outer ring tangentially emerges from the one component of the sliding surface pair and/or opens tangentially into the surface forming the rolling track. With the aid of the proposed configuration, an edgeless transition may be implemented between the surface sections.

Another advantageous specific embodiment provides for an angular ball bearing, in which the sliding surface pair forms an end area on its end facing away from the rolling element pockets in such a way that—in the axially parallel position of the cage and the outer ring—the distance between the surfaces forming the sliding surface pair is monotonically increased, the increase growing continuously (second distance progression). In one advantageous refinement, the transition area transitions directly into the end area. The total surface forming one part of the sliding surface pair on the outer ring is thus designed in the shape of a ball. In one refinement, the transition area may transition directly into the end area.

In one advantageous specific embodiment, the balls of the angular ball bearing are accommodated by the rolling element pockets arranged along the cage circumference and are guided along a rolling track on the inner circumference of the outer ring, the axial position of the starting point of the distance progression being selected in such a way that, in each operating state, the contact point between the cage and the outer ring is situated at a distance from the area of the rolling track and/or the area of the rolling element pockets. The specific embodiment advantageously avoids a corner contact between the components situated relatively movable to each other.

In another specific embodiment, which is combinable with all aforementioned features, the rolling element pockets are arranged in an eccentrically offset manner in the direction of a first axial end and expose an extended cage guiding surface at the second axial end, the extended cage guiding surface being situated on the outer circumference of the cage and guiding the cage on the inner circumference of the outer ring. A comparatively large guiding surface is advantageously created, and the installation space required by the cage in the axial direction is simultaneously optimized.

In one refinement, which is combinable with all aforementioned features, the balls are guided on an inner and an outer rolling track, the inner rolling track being situated on the outer circumference of either an inner ring or a rotor shaft. The integration of the rolling track into the design of the rotor shaft makes it possible to optimally coordinate the bearing arrangement and the shaft to be supported. Alternatively, however, the bearing arrangement in the form of a bearing cartridge including an inner ring is also possible, the inner ring being able to have a two-part design.

According to another specific embodiment of the proposed angular ball bearing, which is combinable with all aforementioned features, the angular ball bearing is a two-row angular ball bearing of a turbocharger, the two-row angular ball bearing guiding a rotor shaft of the turbocharger in an O arrangement. The proposed bearing arrangement advantageously effectuates the support of a rotor shaft for a turbocharger, a turbo-compound or a comparable application having a rapidly rotating shaft. Rapidly rotating shafts usually reach values of a maximum of 300,000 revolutions per minute; in series applications, approximately 150,000 revolutions per minute are reached.

The present invention also provides an angular ball bearing for a turbocharger, which includes an inner and an outer rolling track, in which balls are guided as rolling elements, and a cage, along whose circumference rolling element pockets are arranged and along whose inner circumference a cage guiding surface runs at the end, which forms a sliding surface pair together with a surface on the outer circumference of the inner ring or rotor shaft containing the inner rolling track, characterized in that the sliding surface pair forms an end area on its end facing away from the rolling element pockets in such a way that—in the axially parallel position of the cage and the outer ring—the distance between the surfaces forming the sliding surface pair is monotonically increased, the increase growing continuously (distance progression). The present invention advantageously avoids a corner contact between the cage and the inner ring or the rotor shaft, which may occur as a result of a tilting of the cage. The aforementioned specific embodiments may be similarly transferred to a cage guided on the inner ring.

BRIEF DESCRIPTION OF THE DRAWINGS

The present invention is now explained in greater detail on the basis of exemplary embodiments, reference being made to the drawings. Functionally identical elements of the explained specific embodiments are identified by the same reference numerals.

FIGS. 6 through 9 show a sectional representation of a second exemplary embodiment;

FIGS. 18 through 21 show a sectional representation of a fifth exemplary embodiment;

FIGS. 22 through 25 show a sectional representation of a sixth exemplary embodiment.

DETAILED DESCRIPTION

Figure 1:
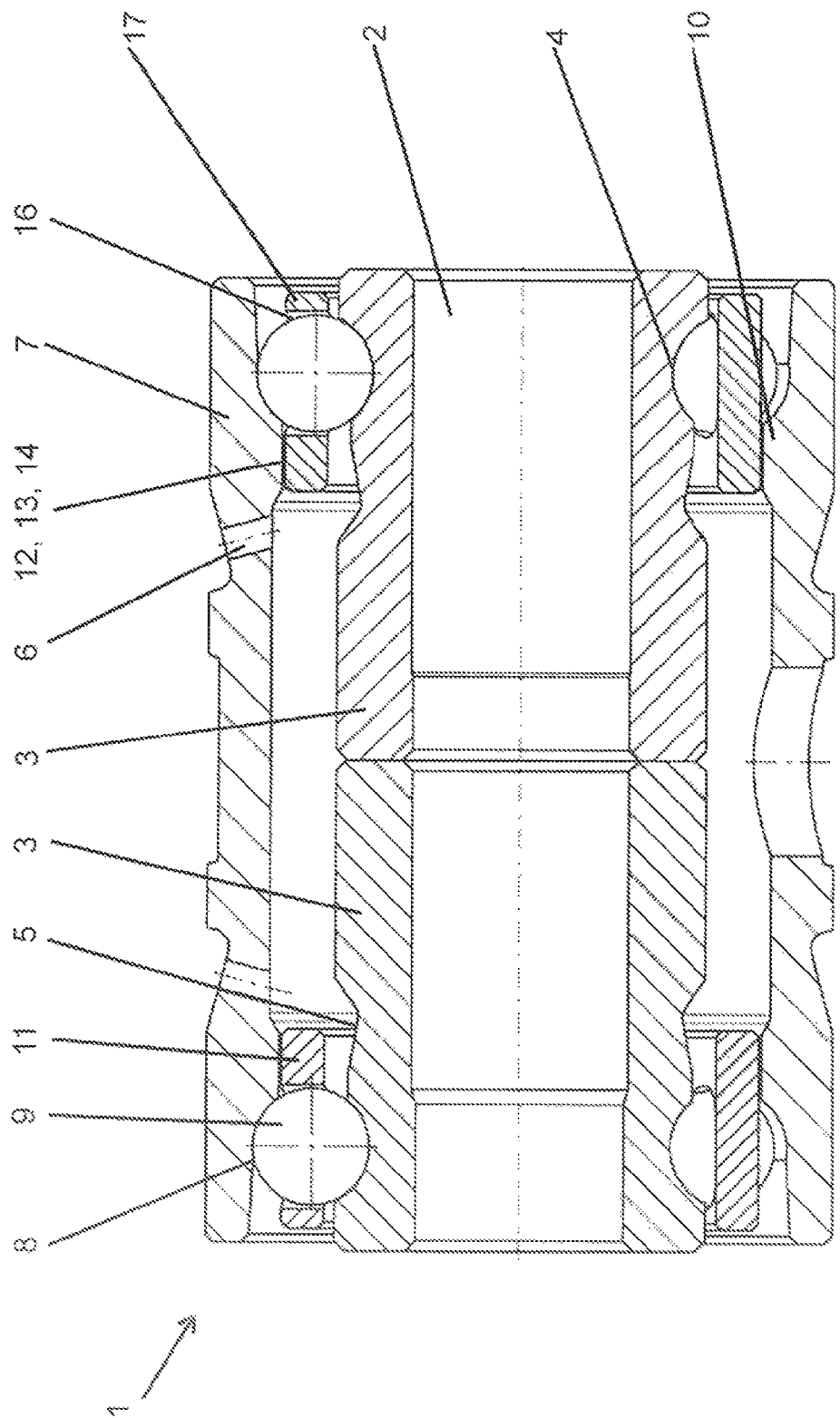
FIG. 1 shows a longitudinal sectional view of a bearing cartridge of a turbocharger according to the prior art.

FIG. 1 shows a longitudinal sectional view of a bearing cartridge 1 of a turbocharger according to the prior art which is not further depicted. Rotor shaft 2 carries an inner ring 3 of bearing arrangement, which has a two-part design. On its outer circumference, the contour of inner ring 3 forms inner rolling tracks 4 and a groove 5, which is used to distribute oil. The oil is supplied via inlet bores 6, which are situated on outer ring 7—which has a one-part design—of the bearing arrangement.

Outer rolling tracks 8 are situated on the inner circumference of outer ring 7 and, together with inner rolling tracks 4, accommodate balls 9 as rolling elements, The contour of inner and outer rings 3, 7 form angular ball bearings via their shoulders 10, the pressure lines of the angular ball bearings facing outward in the illustrated bearing arrangement (O arrangement).

Balls 9 are situated a distance apart with the aid of a cage 11. In the area of bearing shoulder 10, cage 11 has a cage guiding surface 12, which forms a sliding surface pair 14 together with a corresponding surface 13 on the inner circumference of outer ring 7. Rolling element pockets 16 for accommodating balls 9 are situated in an eccentrically offset manner in the direction of first axial end 17, so that an extended cage guiding surface 12 is exposed on second axial end 15.

Figure 2:
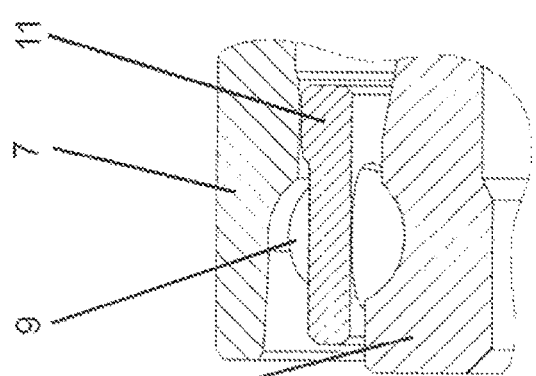
FIGS. 2 through 5 show a sectional representation of a first exemplary embodiment.
Figure 3:
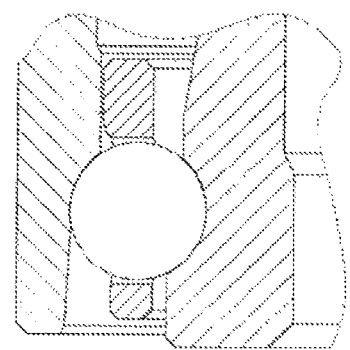
Figure 4:
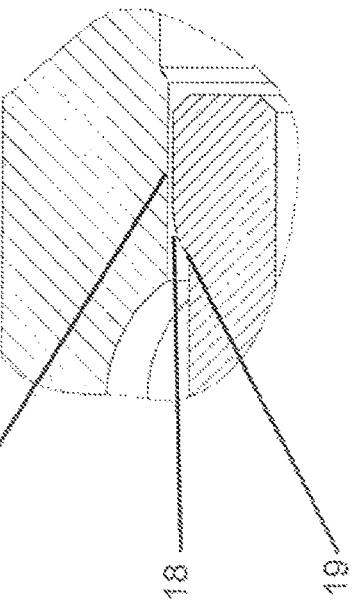

FIGS. 2 through 5 show a first exemplary embodiment. FIG. 2 shows a detail of a bearing arrangement, which includes an outer ring 7, and inner ring 3, balls 9 as rolling elements and a cage 11. A cage guiding surface 12 runs on cage 11 on the end and forms a sliding surface pair 14 together with a surface 13 on the inner circumference of outer ring 7. As shown in FIG. 4, sliding surface pair 14, in turn, forms a transition area 18 on its end facing rolling element pockets 16 in such a way that—in the illustrated axially parallel position of cage 11 and outer ring 7—the distance between surfaces 12, 13 forming sliding surface pair 14 is monotonically increased, the increase growing continuously. In the illustrated exemplary embodiment, the distance progression is implemented with the aid of a cage 11 which is not uniform with regard to its outer diameter, the outer diameter being larger in the area of sliding surface pair 14 than in transition area 18.

Figure 5:
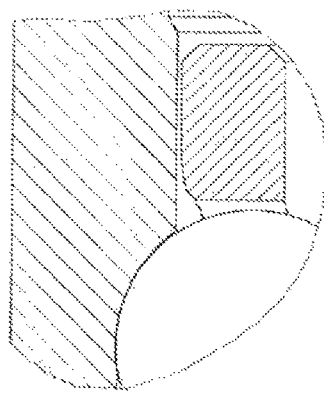
Figure 10:
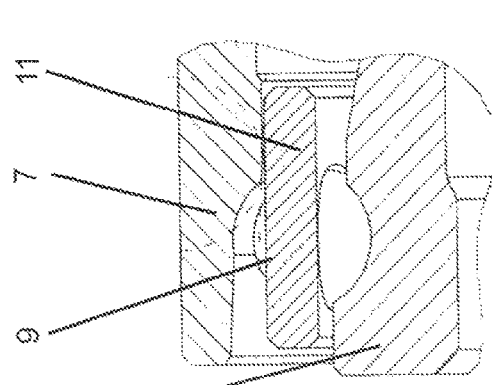
FIGS. 10 through 13 show a sectional representation of a third exemplary embodiment.

Transition area 18 transitions to a runout area 19 at the end facing away from the area forming sliding surface pair 14. Runout area 19 is designed in such a way that the outer diameter of cage 11 is reduced to its minimum value. The minimum value is maintained over the further profile. The axial position and the diameter transition are designed in such a way that the contact between cage guiding surface 12 and the outer ring is situated at a distance from the rolling track edge. The contact point on cage 11 is ideally also situated at a distance from the pocket opening. FIGS. 3 and 5 show the same exemplary embodiment in a second sectional plane.

FIGS. 6 through 9 show a second exemplary embodiment. The contour of cage 11 in FIG. 6 essentially shows the same contour on its outer circumference as in the preceding first exemplary embodiment. However, an area 20 which has a minimum outer diameter and is enclosed by areas 18, 19, 21 having a larger diameter abuts runout area 19 at the end facing away from transition area 18. As shown in the detail in FIG. 8, area 20 forms a circumferential groove 20. Area 20 of the reduced outer diameter of cage 11 is thus limited to the area of the rolling track edges of outer ring 7. The width is selected in such a way that no contact with the outer ring edge takes place in all axial positions of cage 11 with respect to ball set 9 which occur during operation as a result of tilting, and the contact point on cage 11 is situated on the far side of the cage pocket openings. FIGS. 7 and 9 show the same exemplary embodiment in a second sectional plane.

Figure 11:
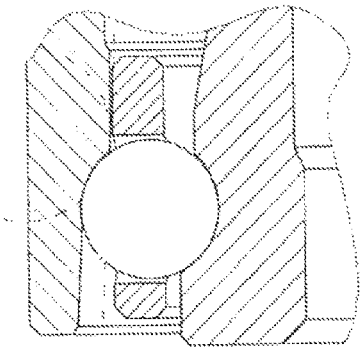
Figure 12:
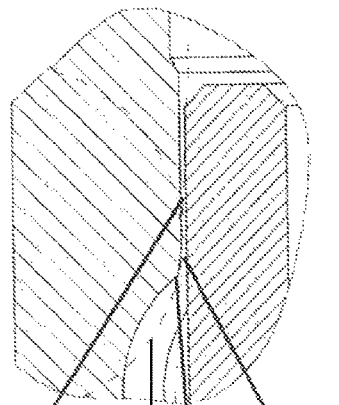
Figure 13:
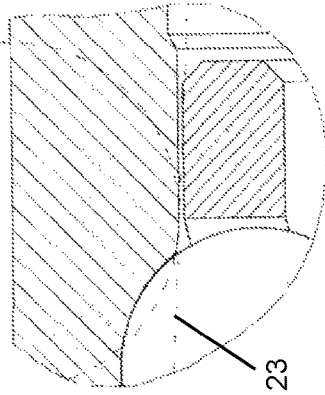
Figure 14:
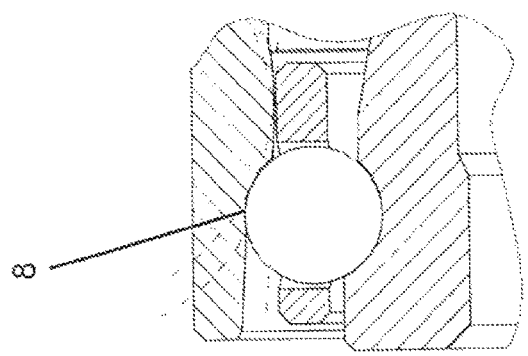
FIGS. 14 through 17 show a sectional representation of a fourth exemplary embodiment.
Figure 15:
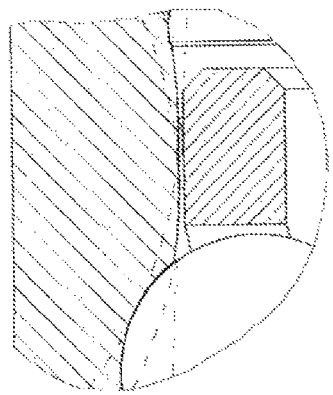
Figure 16:
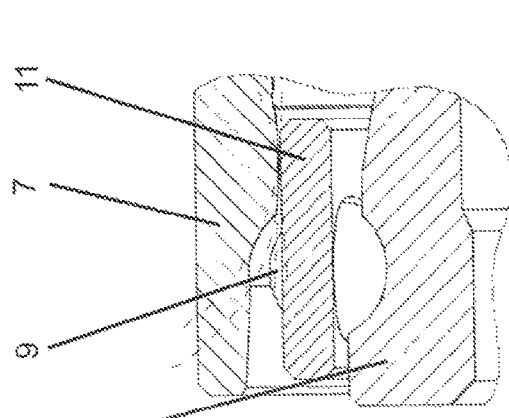
Figure 17:
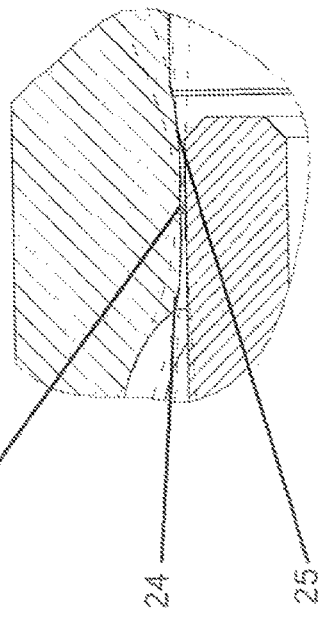

FIGS. 10 through 13 show a third exemplary embodiment, which illustrates an implementation of the distance progression with the aid of the contour of the inner circumference on outer ring 7. The inner diameter of outer ring 7 is thus smaller in the area of sliding surface pair 14 than in transition area 18. The surface forming transition area 18 on the inner diameter of outer ring 7 tangentially emerges from the surface forming the one component of sliding surface pair 14, as illustrated in the detail in FIG. 12. A radius 22, which runs out tangentially in cage guiding surface 12 is illustrated, which meets rolling track 8 at a free angle. Dashed straight line 23 illustrates the position of the outer circumference of cage 11, which sets in as a result of a tilting. FIGS. 11 and 13 show the same exemplary embodiment in a second sectional plane.

A fourth exemplary embodiment is illustrated in FIGS. 14 through 17. The distance progression is implemented as in the preceding exemplary embodiment; however, radius 24 is selected in such a way that the contact point between cage 11 and cage guiding surface 12 is situated at a great distance from the recesses for rolling element pockets 16. On the side of cage guiding surface 12 facing away from rolling track 8, a second radius 25 is introduced on outer ring 7.

FIGS. 18 through 21 show a fifth exemplary embodiment. In the detailed view in FIG. 20, it is apparent that a continuous radius 26 is situated on the inner circumference of outer ring 7 across entire cage guiding surface 12. FIG. 18 shows an overall view of the bearing, the view of a second sectional plane being added in FIGS. 19 and 21. FIGS. 22 through 25 show a sixth specific embodiment, including an outer ring 7, which has an elliptical contour 27 in the transition area.

LIST OF REFERENCE NUMERALS 1 bearing cartridge
2 rotor shaft
3 inner ring
4 inner rolling track
5 groove
6 oil supply bore, inlet bore
7 outer ring
8 outer rolling track
9 ball
10 shoulder
11 cage
12 cage guiding surface
13 surface on the inner circumference of the outer ring
14 sliding surface pair
15 second axial end
16 rolling element pockets
17 first axial end
18 transitional area
19 runout area
20 groove, area
21 area having an enlarged diameter
22 radius 23 straight line
24 radius
25 radius
26 continuous radius
27 elliptical contour

What is claimed is:

1. An angular ball bearing for a turbocharger, the bearing being centered on a center axis defining an axial direction, comprising:
an outer ring and a cage, the cage including a first axial end and a second axial end, the cage including rolling element pockets situated along an outer circumference of the cage, a cage guiding surface running axially along the outer circumference from the second axial end of the cage to a first transition surface, the cage guiding surface forming a sliding surface pair together with an outer ring sliding surface on an inner circumference of the outer ring, the outer ring sliding surface running axially along the inner circumference to a second transition surface, the first transition surface and the second transition surface forming a transition area facing the rolling element pockets in such a way that—in an axially parallel position of the cage and the outer ring—a distance between the cage guiding surface and the outer ring sliding surface on the inner circumference of the outer ring forming the sliding surface pair is monotonically increased, the increase growing continuously to define a distance progression.

2. The angular ball bearing as recited in claim 1 wherein the distance progression is implemented with the aid of the cage, the cage not being uniform with regard to an outer diameter, the outer diameter being larger in the area of the sliding surface pair outside the transition area than in the transition area.

3. The angular ball bearing as recited in claim 2 wherein the transition area transitions to a runout area at the end facing away from the area of the sliding surface pair, the runout area being designed in such a way that the outer diameter of the cage is reduced to a minimum value.

4. The angular ball bearing as recited in claim 3 wherein an area having a minimum outer diameter is enclosed by areas having a larger diameter abutting the runout area at an end facing away from the transition area.

5. The angular ball bearing as recited in claim 1 wherein the distance progression is implemented with the aid of the outer ring, the outer ring not being uniform with regard to an inner diameter, the inner diameter being larger in the area of the sliding surface pair outside of the transition area than in the transition area.

6. The angular ball bearing as recited in claim 5 wherein a surface forming the transition area on the inner diameter of the outer ring tangentially emerges from one component of the sliding surface pair or opens tangentially into the surface forming a rolling track.

7. The angular ball bearing as recited in claim 1 wherein the sliding surface pair forms an end area on an end facing away from the rolling element pockets in such a way that—in the axially parallel position of the cage and the outer ring—a distance between the cage guiding surface and the surface on the inner circumference of the outer ring forming the sliding surface pair is monotonically increased, the increase growing continuously and defining a second distance progression.

8. The angular ball bearing as recited in claim 1 wherein balls are accommodated by the rolling element pockets arranged along the cage circumference and are guided along a rolling track on the inner circumference of the outer ring, the axial position of the starting point of the distance progression being selected in such a way that, in each operating state, the contact point between the cage and the outer ring is situated at a distance from the area of the rolling track or the area of the rolling element pockets.

9. The angular ball bearing as recited in claim 1 wherein a profile of the cage guiding surface and the surface on the inner circumference of the outer ring in the transition area are machining worked surfaces.

10. An angular ball bearing for a turbocharger, the bearing being centered on a center axis defining an axial direction, comprising:
an inner and an outer rolling track;
balls guided as rolling elements; and
a cage, the cage including a first axial end and a second axial end, the cage including rolling element pockets situated along an outer circumference of the cage, a cage guiding surface running along an inner circumference of the cage from the second axial of the cage to a first transition surface, the cage guiding surface forming a sliding surface pair together with a sliding surface on an outer circumference of an inner ring or rotor shaft containing the inner rolling track, the sliding surface running axially along the inner circumference to a second transition surface;
the first transition surface and the second transition surface forming a transition area facing away from the rolling element pockets in such a way that—in an axially parallel position of the cage and an outer ring—a distance between the cage guiding surface and the sliding surface forming the sliding surface pair is monotonically increased, the increase growing continuously to define a distance progression.

11. The angular ball bearing as recited in claim 1 wherein the rolling element pockets are situated along the outer circumference of the cage eccentrically offset in a direction of the first axial end.

12. The angular ball bearing as recited in claim 10 wherein the rolling element pockets are situated along the outer circumference of the cage eccentrically offset in a direction of the first axial end.

\* \* \* \* \*